(No Model.)
F. W. HUBBARD.
DRAG SCRAPER.
No. 348,740. Patented Sept. 7, 1886.
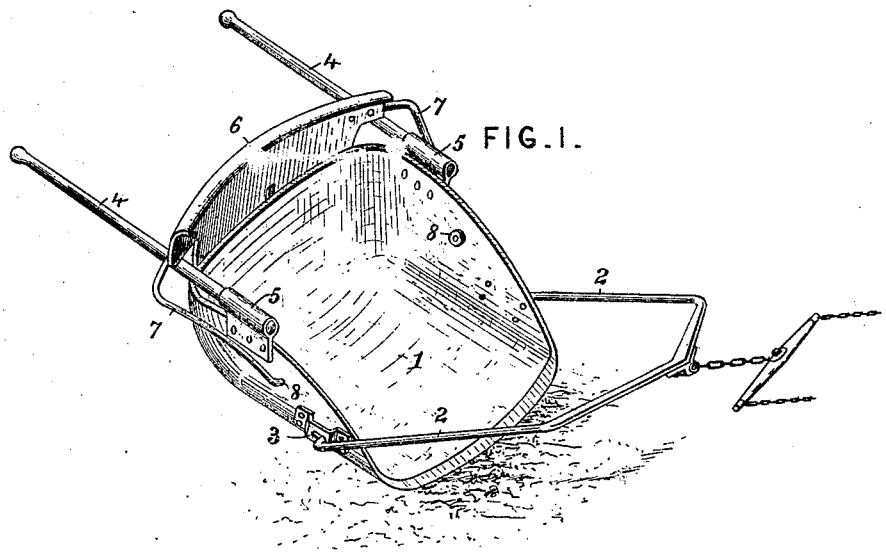
FIG. I.
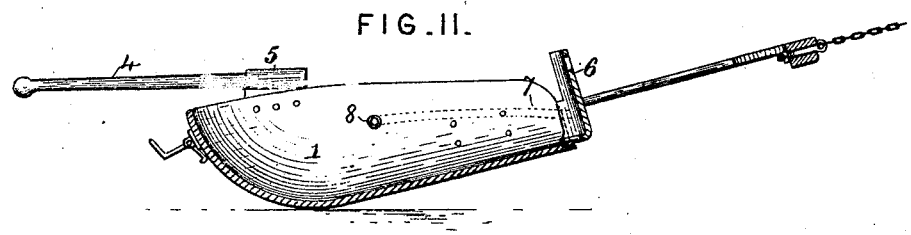
FIG. II.
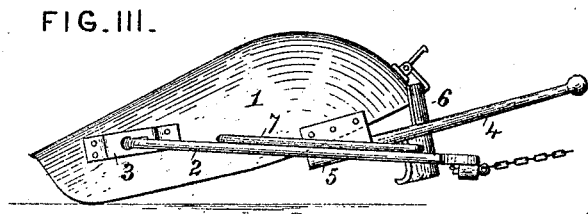
FIG. III.
Attest:
Geo. P. Smallwood,
Geo. L. Wheelock.
Inventor:
Fred W. Hubbard.
By Knight Bros.
attys

United States Patent Office.

FRED W. HUBBARD, OF COLUMBUS, OHIO, ASSIGNOR TO THE KILBOURNE & JACOBS MANUFACTURING COMPANY, OF SAME PLACE.

DRAG-SCRAPER.

SPECIFICATION forming part of Letters Patent No. 348,740, dated September 7, 1886.

Application filed October 31, 1885. Serial No. 181,504. (No model.)

*To all whom it may concern:*

Be it known that I, FRED W. HUBBARD, a citizen of the United States, residing at Columbus, in the county of Franklin and State of Ohio, have invented a new and useful Improvement in Drag-Scrapers, of which the following is a specification.

My invention relates to the provision of a reversible end-gate, which while the scraper is filling prevents dirt from running over the back of the bowl, and when the scraper is filled is thrown across the mouth of the bowl, so as to keep the earth from falling out on the way to the dump.

It is well known that the ordinary drag-scraper is liable to lose a large part of its load on the way to the dump when dragged over rough ground. My invention obviates this difficulty in an economical and efficient manner, and, moreover, enables the scraper to take a much larger load by preventing the overflow of the dirt at the back in the act of filling. It also acts as a shoe for carrying the bowl when inverted.

In the accompanying drawings, Figure I is a perspective view of the scraper in filling position. Fig. II is a vertical section showing the end-gate reversed and the scraper on the way to the dump. Fig. III is an elevation showing the scraper inverted as when on the way from the dump to the filling-ground.

1 represents a drag-scraper bowl of common form. 2 represents the draft bail or hounds, hinged in lugs or sockets 3 on the sides of the bowl, and 4 4 the usual handles inserted in sockets 5. The end-gate 6 is carried by a yoke or arms, 7, hinged at 8 in the sides of the bowl at a point about equidistant between its front and back, so as to adapt the end-gate to occupy the different positions shown in the drawings.

The operation is as follows: When the scraper is being filled, the end-gate 6 is at the back, as illustrated in Fig. I, leaving the front of the bowl unobstructed for the entrance of earth and preventing the overflow of earth at the back, which is otherwise liable to occur by the forward movement of the scraper in the act of filling. When the bowl is filled, its nose is lifted out of the ground by the depression of the handles 4 in the customary manner. The operator at the same time, by a kick or lifting the end-gate with his foot, throws it into the reversed position shown in Fig. II, so that it will retain the load and prevent the dirt from being shaken out in front while the scraper is passing over the ground to the dump. On reaching the dumping-ground, the bowl 1 is inverted in the usual way by lifting on the handles 4, the effect being to cause the mouth of the scraper to be drawn away from the end-gate by contact with the ground as the team moves forward, the bowl 1 being completely inverted and the handles resting on the arms 7 of the end-gate, while the latter serves as a shoe or runner, protecting the handle-sockets 5 from wearing on the ground as the implement is moved back to the place of filling. This position is illustrated in Fig. III. The filling-ground being reached, the scraper is again reversed in customary manner, and the work proceeds as before.

Having thus described my invention, the following is what I claim as new therein and desire to secure by Letters Patent:

1. A drag-scraper having an end-gate hinged to the sides of the bowl by one or more arms, adapting it to be dropped in front of the bowl while the latter is resting on the ground, as herein shown and described.

2. A drag-scraper having an end-gate hinged to the bowl by an arm or arms independently of the draft-hounds and handles, said end-gate closing the front of the bowl, and automatically removed therefrom in dumping, as explained.

3. A drag-scraper having a reversible end-gate hinged to the bowl by one or more arms and occupying an effective position at either the front or back of the bowl, as explained.

4. A drag-scraper having an end-gate, preventing the escape of dirt from the bowl while the latter is in filling or carrying position, and serving as a shoe for the bail to rest and run on when inverted, as explained.

FRED W. HUBBARD.

Witnesses:
 BRYAN COLLINS,
 F. F. HOFFMAN.